June 5, 1951 P. R. WATSON 2,555,771
GAS METER PROVER APPARATUS
Filed Sept. 11, 1948 2 Sheets-Sheet 1
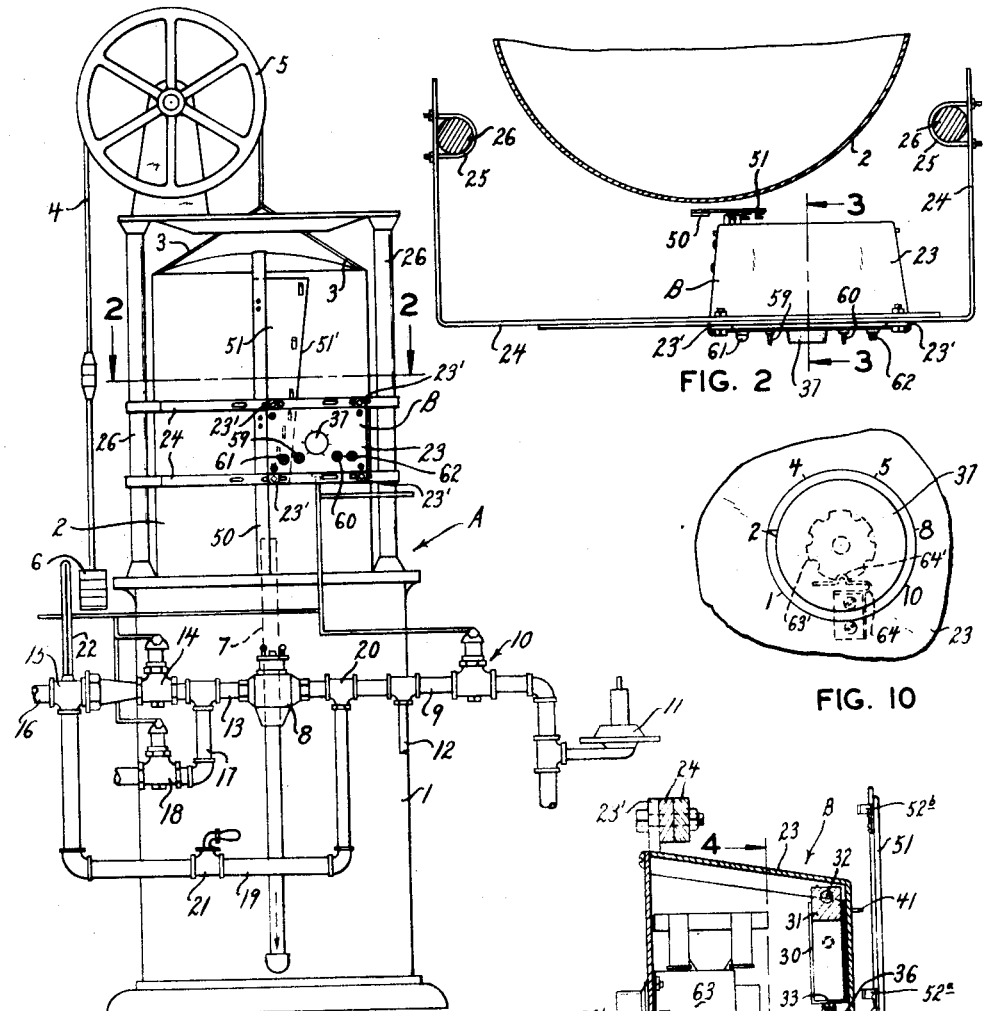
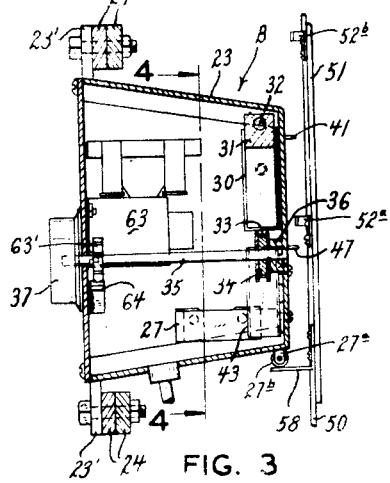
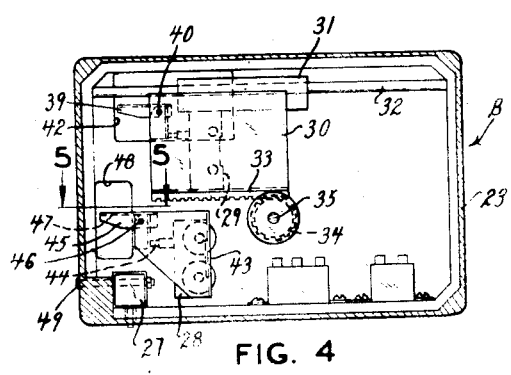
INVENTOR
PHILIP R. WATSON
BY Em Harrington
ATTORNEY June 5, 1951 P. R. WATSON 2,555,771
GAS METER PROVER APPARATUS
Filed Sept. 11, 1948 2 Sheets-Sheet 2
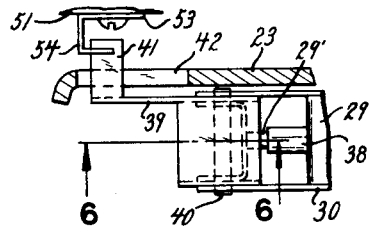
FIG. 5
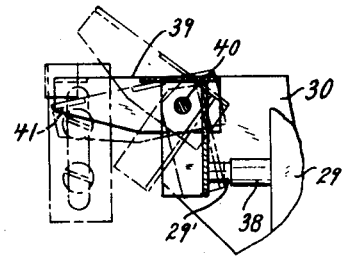
FIG. 6
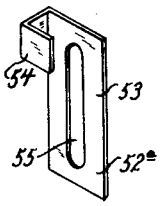
FIG. 7
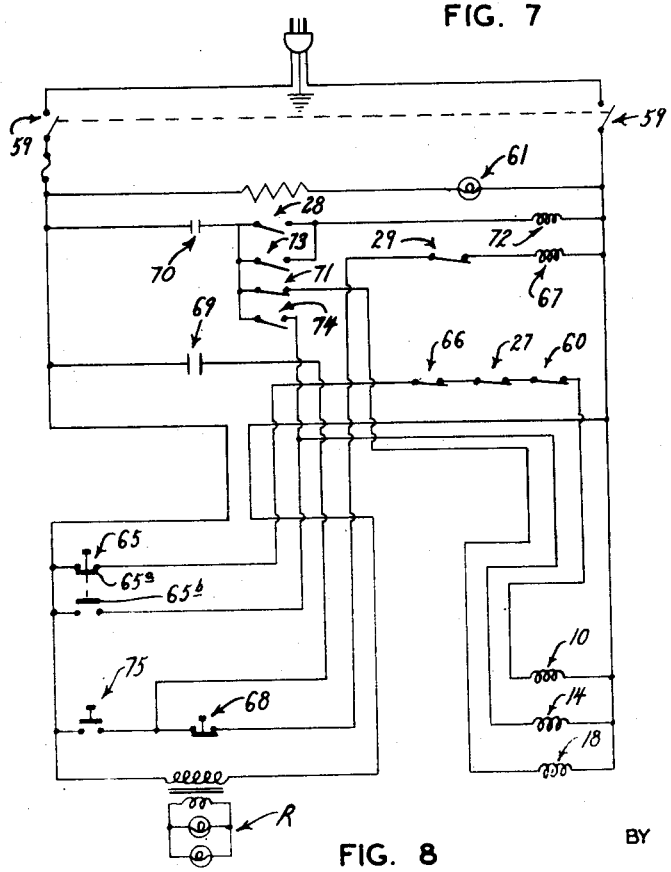
FIG. 8
FIG. 9
INVENTOR
PHILIP R. WATSON
BY
*Ern Harrington*
ATTORNEY Patented June 5, 1951

2,555,771

UNITED STATES PATENT OFFICE 2,555,771

GAS METER PROVER APPARATUS

Philip R. Watson, Valley Park, Mo., assignor to Electronic Tester of Gas Meters, Inc., St. Louis, Mo., a corporation of Missouri Application September 11, 1948, Serial No. 48,851

6 Claims. (Cl. 73—3)

This invention relates to gas meter prover apparatus of the type adapted for use in testing the accuracy of movement and registration of the registering means of gas meters by passing through the gas meters being tested accurately measured volumes of air, or other fluid, the predominant object of the invention being to provide an improved apparatus of this type which is relatively simple in construction and operation, and is so completely automatic in its operation that the opportunity for human error to effect the gas meter testing operations is reduced to a minimum.

Commercial gas meters of various types having bellows displacement means for determination of the volume of gas passed through the meters, and provided with geared indexing means for registering said volume of gas passed through the meters, have heretofore been tested for accuracy by passing through the meters accurately measured volumes of air from accurately calibrated air tanks or prover bells connected to the meters and controlled manually. In making this type of test, the operator observed the movement of the prover index hand with respect to the meter prover dial while passing an amount of air through the meter that would cause the prover index hand to make one revolution, which was equivalent to the registration of passage through the meter of two cubic feet of air. The accuracy of such a test was dependent on the keenness of the eye of the operator making the test, and his coordination of eye and hand, inasmuch as the flow of air to the meter was shut off manually by the operator when the index hand of the meter had made a complete revolution, as nearly as could be judged by the eye, and the actual volume passed through the meter was determined by the shrinkage in volume of the air in the air tank or prover bell. If the test indicated that the volume of air passed through the meter was more or less than exactly two cubic feet, the meter was registered as either fast or slow and proper adjustments were made of its mechanism to bring it to accuracy, the test being repeated until the meter registered accurately.

The testing operation briefly described above was subject to a number of possibilities of error, and the prime purpose of this invention is to provide a simple and improved testing apparatus in the use and operation of which these possibilities of error are eliminated. Briefly stated, the starting and stopping of the gas meter prover of the present invention is controlled automatically through the operation of electrical means which includes switching mechanism that controls flow of electrical current that operates electrical means which opens and closes valve means when exactly the predetermined volume of air to be used in the test has been passed from the bell of the prover, to and through the meter under test. The apparatus of the present invention differs in its operation from the manual meter testing method described above, in that an accurately calibrated prover bell is established as the standard of comparison and the flow of air from this prover bell to the meter under test is accurately controlled in an automatic manner so as to eliminate human error.

Fig. 1 is a front elevation of the improved gas meter prover apparatus of the present invention.

Fig. 2 is an enlarged, fragmentary horizontal section taken on line 2—2 of Fig. 1.

Fig. 3 is a vertical section taken on line 3—3 of Fig. 2.

Fig. 4 is a vertical section taken on line 4—4 of Fig. 3.

Fig. 5 is an enlarged section taken on line 5—5 of Fig. 4.

Fig. 6 is a section taken on line 6—6 of Fig. 5.

Fig. 7 is a perspective view of one of the switch tripping elements which are associated with the bell of the meter prover apparatus of this invention.

Fig. 8 is a diagrammatical view illustrating the electrical wire arrangement of the improved gas meter prover apparatus of the present invention.

Fig. 9 is a front elevation of a scale and plate which are carried by the prover bell of the apparatus of this invention.

Fig. 10 is a fragmentary view of a face portion of the front wall of the housing of the control unit of the meter prover of this invention.

In the drawings, wherein is shown for purposes of illustration, merely, one embodiment of the invention, A designates in Fig. 1 the gas meter prover apparatus generally. The gas meter prover apparatus A comprises a lower tank portion 1 and a bell 2 which is supported for vertical movement with respect to said lower tank portion 1, there being a body of water (not shown) contained in the lower tank portion 1 whose surface provides the bottom wall of an air chamber within the bell. The bell 2 has suitably attached to its upper portion, by means of attaching elements 3, a flexible member 4, said flexible member being passed over a rotatably supported pulley 5 and having weights 6 attached to its free end which serve to counterbalance the weight of the bell 2.

Forming a part of the gas meter prover apparatus A is a pipe assembly which includes a pipe 7 that communicates with the air chamber within the bell 2 and extends downwardly therefrom within the interior of the lower tank portion 1 of the prover, said pipe 7 extending through a lower wall portion of the prover tank and extending upwardly at the exterior of the lower tank portion of the prover to a member 8. Connecting into the member 8 is a pipe 9 which leads from a source of air (not shown), said pipe 9 being provided with a magnetic valve 10 which, as will presently appear herein, controls the passage of air into the air chamber of the prover bell 2. The pipe 9 is provided also with a pressure regulator 11 which controls the pressure of the air that passes through said pipe 9 to the air chamber of the prover bell, and additionally said pipe 9 is provided with a connection 12 which is adapted to lead to a pressure gauge (not shown).

Connected into the member 8 is a pipe 13 in which is interposed a magnetic valve 14, said magnetic valve 14 being connected to a connection 15 into which is also connected a pipe 16 which leads to the inlet of a meter to be tested, said magnetic valve 14 serving to control the flow of air from the prover bell 2 to a meter being tested with the aid of the gas meter prover apparatus. Connected into the pipe 13 is a pipe and fitting assembly 17, and connected into said pipe and fitting assembly 17 is a magnetic valve 18 which, as will presently appear herein, serves to control leveling of the prover bell 2 by venting air from said bell to atmosphere. Additionally the general pipe assembly of the gas meter prover apparatus includes a pipe and fitting assembly 19 which provides a by-pass around the magnetic valves 14 and 18, one end of said by-pass being connected into a fitting 20 which is connected in the pipe 9, and the opposite end of said by-pass being connected into the fitting 15 into which the magnetic valve 14 and the pipe 16 are connected. The pipe and fitting assembly 19 which provides the by-pass around the magnetic valves 14 and 18 has interposed therein a manually operable valve 21 which, on actuation thereof, permits air to flow from the prover bell 2 to the meter being tested to allow for manual testing of the meter, if required, or to permit purging of the meter so as to bring the prover index dial hand of the meter to its starting position. If desired, the fitting 15 may have connected thereto a suitable thermometer 22, in order that the temperature of the air passing to the meter being tested may be indicated.

The improved gas meter prover apparatus of this invention includes a control unit B which comprises a housing 23 that is provided with lugs 23', said lugs serving to receive bolts which secure said housing 23 to vertically spaced bars 24 which are secured by U-bolts 25 to vertical elements 26 that are parts of the meter prover structure (Figs. 1 and 2). Arranged within the housing 23 of the control unit are three electrical switches 27, 28, and 29 which serve to control the action of the gas meter prover of this invention. The switches 27 and 28 are fixedly mounted within the housing 23 of the control unit, while the switch 29 is supported within said housing 23 for adjusting therein. The switches 27, 28, and 29 may be of any suitable type, although it has been discovered that so-called "precision" limit switches function in the operation of the meter prover of this invention in a highly efficient manner.

The adjustable switch 29 comprises a U-shaped carriage 30 which is provided at its top with a block 31 through which an opening is formed longitudinally, a rod 32 being extended through said opening of said block and said rod being supported at its opposite ends within the housing at the upper rear portion thereof (Figs. 3 and 4). The block 31 is slidable longitudinally of the rod 32, the U-shaped carriage moving with said block, and to effect adjustment of said block and carriage a rack 33 is secured to the lower wall of the carriage which is engaged by a pinion 34. The pinion 34 is fixedly mounted on a shaft 35 which is supported for rotation by the front wall of the housing 23 and by a bearing 36 formed on the rear wall of said housing, the forward portion of said shaft being extended through and projected beyond the front wall of the housing 23 and said projected portion of said shaft having fixedly mounted thereon a knob 37.

The electrical switch 29 is supported within the U-shaped carriage and it includes an actuating stem 29' which is supported by an element 38 for inward and outward sliding movement. The outer end of the actuating stem 29' of the switch 29 is engaged by a substantially vertical portion of a lever 39 which is of angular shape (Figs. 5 and 6), said lever being supported for pivotal movement by a pivot pin 40 which passes through openings formed through opposed wall portions of said lever 39 and is supported at its opposite ends in openings formed through opposed wall portions of the U-shaped carriage 30. The substantially horizontal portion of the angular lever 39 is provided at its outer end with a rearwardly projected extension 41 which serves a purpose to be hereinafter set forth, and in this connection it is to be noted that the rear wall of the housing 23 of the control unit B is provided with an opening 42 through which the extension 41 of the angular lever 39 projects.

The electrical switch 28 of the control unit B is supported fixedly within the housing 23 by a bracket structure 43 which is secured to the rear wall of said housing 23, said switch 28 being provided with an actuating stem 44 which operates the switch to its open and closed positions. The outer end of the stem 44 is engaged by an angular lever 45 which is similar to the angular lever 39 associated with the electrical switch 29, as has been heretofore explained, said angular lever 45 being supported for pivotal movement with respect to the bracket structure 43 by a pivot element 46. Also, the substantially horizontal portion of the angular lever 45 is provided with a rearwardly projected extension 47 which projects through an opening 48 formed through the rear wall of the housing 23 of the control unit B.

The electrical switch 27 which is mounted fixedly within the housing 23 of the control unit B is secured to a side wall of said housing by means of suitable fastening devices 49. The switch 27 is a limit switch and it functions to control the flow of air to the prover bell 2 prior to a test. In other words, when the incoming air has filled the prover bell so as to cause said bell to reach the limit of its upward movement, the switch 27 is actuated to its open position whereby the magnetic valve 10 will be deenergized and closed. The switch 27 includes an actuating member 27a which is provided with a roller 27b.

The bell 2 of the gas meter prover A is provided with a vertically disposed scale 50 which is suitably fixed thereto for movement therewith, and this scale is provided with the usual graduations formed on scales of prover bells. In other words, the graduations on the scale 50 include a zero mark, and one, two, four, five, eight and ten cubic feet marks, if the bell is a standard ten cubic feet prover bell, and additional cubic feet marks if it be a larger bell. Secured to the scale 50 is a vertically disposed plate 51 which is of tapered shape, said plate being of greater width at its top than at its bottom, and the tapered shape of said plate 51 resulting from the fact that the right-hand edge 51' of the plate, as said plate is shown in Fig. 1, is inclined downwardly and inwardly from top to bottom of the plate. The plate 51 has secured thereto a plurality of abutment elements 52a, 52b, 52c, 52d, 52e, 52f and 52g, the abutment elements being respectively located at the one, two, four, five, eight and ten feet marks on the scale 50. The abutment elements 52a, 52b, 52c, 52d, 52e, 52f and 52g are still constructed as is shown in Fig. 7 wherein is illustrated one of said abutment elements, that is to say, each of the abutment elements includes a base portion 53 from which an angular extension 54 is extended outwardly. Also, the base portion of each of the abutment elements is provided with a vertical slot 55 through which the shanks of a pair of clamping screws 56 extend, said slots permitting of the abutment element being adjusted relative to the plate 51 and the heads of said clamping screws engaging the abutment element so as to clamp it in the position to which it is adjusted. Additionally, the plate 51 itself is provided with a pair of vertical slots 57 through which the shanks of clamping screws extend, said slots permitting the plate 51 to be adjusted vertically relative to the scale 50 and the screws clamping said plate in positions to which it has been adjusted. In addition to the abutment elements 52a, 52b, 52c, 52d, 52e, 52f and 52g mentioned above, the plate 51 has secured thereto an abutment element 58 which serves, in a manner to be hereinafter explained, to actuate the limit switch 27.

The front wall of the housing 23 of the control unit B supports a switch 59 and a switch 60 which serve purposes to be hereinafter described. Additionally, said front wall of said housing 23 supports a pilot light 61 which serves to indicate when electrical energy has been turned on, and a fuse 62 which serves an obvious purpose. Also, the housing 23 has mounted thereon a relay housing 63 which receives a pair of relays that constitute parts of the apparatus of the present invention, and the shaft 35 associated with said housing 23 has mounted thereon a disk 63' which is provided with a plurality of circumferentially spaced notches which receive a projection 64' of a spring detent 64 so as to lock the shaft 35 in positions to which it has been adjusted by rotation of the knob 37.

In describing the operation of the improved gas meter prover A of the present invention it will be assumed that electrical power is off and that the prover bell 2 is in its lowermost position with the meter prover A connected to a meter to be tested. Let it be assumed, also, that it is desired to pass two cubic feet of air through the meter being tested in performing the test and that the knob 37 has been rotated to the position where its indicator points to the numeral 2 of the group of numerals which appear on the front wall of the housing 23 in embracing relation with respect to said knob 37. Such rotation of the knob 37 subjects the shaft 35 to rotation which is transmitted by the pinion 34 to the rack 33 of the carriage 30 that supports the switch 29 so as to adjust said carriage and said switch to such position that the extension 41 of the lever 39 is in vertical alinement with respect to the abutment 52c which is located at the two feet mark on the scale 50 of the prover bell 2. Also, if it is desired to pass more or less than two cubic feet of air through a meter being tested the knob 37 is rotated to the proper position so as to adjust the carriage 30 of the switch 29 and thereby position the extension 41 in vertical alinement with one of the other abutments which is located at the desired feet mark on the scale 50 of the prover bell 2.

With the adjustment of the adjustable switch 29 properly made to cause two cubic feet of air to pass through the meter being tested, the electrical power is turned on by actuating the switch 59, and the switch 60 is then actuated to the closed position. This completes a circuit to the air supply valve 10 through the contact 65a of a purge switch 65, relay contacts 66, and the limit switch 27. The air supply valve 10 then opens, admitting air from pressure line to the prover bell 2, and when the prover bell reaches its uppermost position the limit switch 27 is opened by the abutment 58 on the plate 51 associated with the scale 50 of the prover bell 2, engaging the roller 27b of the actuating element 27a. This breaks the circuit to the air supply valve 10 and said air supply valve closes, and the prover is now ready for a test.

The meter hand is driven to the proper starting point by manual use of the purge switch 65 and actuation of said purge switch causes the contact 65a to open, thereby disabling the air supply valve circuit, and causes the contact 65b of said purge switch to close so as to energize the magnetic valve 14 and admit air to the meter as long as the purge switch is held in its depressed position. When the meter hand reaches the proper starting position the purge switch is released and this opens the circuit to the magnetic valve 14 and re-establishes the circuit to the air supply valve 10, whereupon the prover bell 2 is refilled with air.

The actual test is initiated by depressing the "start" push button 75 which energizes the starting relay 67 through the reset push button 68 and through the "stop" switch 29. When the start relay 67 is energized start relay contacts 69 close thereby sealing in the start relay 67 around the start push button 66, and the start relay contacts 70 also close thereby energizing the vent valve 18 through the contacts 71 of the test relay 72. Also, the contacts 66 of the start relay open, thereby disabling the air supply valve circuit so as to prevent the air supply valve 10 from opening as the bell moves away from the limit switch 27. The prover bell 2 moves downwardly as the vent valve 18 vents air therefrom, and when the bell drops to the zero point the switch 28 closes and energizes the test relay 72. When the test relay is energized the test relay contacts 73 close thereby sealing in the test relay around the switch 28, and test relay contacts 71 open so as to deenergize and close the vent valve 18. Also, when the test relay is energized the test relay contacts 74 close, thereby energizing and opening the valve 14 to admit air to the meter under test. The test is now under way and the prover bell 2 descends steadily and when said bell drops to the point where the appropriate abutment, the abutment 52c, for instance, engages the extension 41 of the angular lever 39 of the switch 29, said switch 29 is opened so as to deenergize the start relay 67. This causes the start relay contacts 70 to open thereby deenergizing and closing the valve 14 so as to stop the flow of air to the meter under test, and deenergize the test relay, and causes the contacts 66 of the start relay to close thereby reenergizing the circuit of the air supply valve 10 so as to cause the prover bell to be refilled with air.

In Fig. 8 is illustrated diagrammatically the wiring R for a reader which is adapted to aid an operator in reading the dial of a meter being tested with the aid of the improved meter prover of this invention. This wiring merely feeds electrical energy to two lamps forming part of the reader structure and hence need not be described in detail herein.

I claim:

1. A meter testing apparatus comprising a prover including a movable member providing a chamber for a meter-testing medium, piping leading from the chamber of said movable member and adapted to be connected to a meter to be tested, an electrically actuated valve interposed in said piping and operable to control passage of testing medium from the chamber of said movable member to the meter being tested, an electrical switch for controlling actuation of said electrically actuated valve, a plurality of spaced abutments supported by said movable member and movable therewith for actuating said switch, and means for adjusting said switch bodily to a position where it may be actuated by one or another of said abutments.

2. A meter testing apparatus comprising a prover including a movable member providing a chamber for a meter-testing medium, piping leading from the chamber of said movable member and adapted to be connected to a meter to be tested, an electrically actuated valve interposed in said piping and operable to control passage of testing medium from the chamber of said movable member to the meter being tested, an electrical switch for controlling actuation of said electrically actuated valve, a plurality of spaced abutments supported by said movable member and movable therewith for actuating said switch, and means for adjusting said switch to a position where it may be actuated by one or another of said abutments, said adjusting means including a knob which is rotatable to different positions to effect adjustment of said switch.

3. A meter testing apparatus comprising a prover including a movable member providing a chamber for a meter-testing medium, piping leading from the chamber of said movable member and adapted to be connected to a meter to be tested, an electrically actuated valve interposed in said piping and operable to control passage of testing medium from the chamber of said movable member to the meter being tested, an electrical switch for controlling actuation of said electrically actuated valve, a plurality of spaced abutments supported by said movable member and movable therewith for actuating said switch, and means for adjusting said switch to a position where it may be actuated by one or another of said abutments, said adjusting means including a knob which is rotatable to different positions relative to a dial to effect adjustment of said switch.

4. A meter testing apparatus comprising a prover including a movable member providing a chamber for a meter-testing medium, piping leading from the chamber of said movable member and adapted to be connected to a meter to be tested, an electrically actuated valve interposed in said piping and operable to control passage of testing medium from the chamber of said movable member to the meter being tested, an electrical switch for controlling actuation of said electrically actuated valve, a plurality of spaced abutments supported by said movable member and movable therewith for actuating said switch, and means for adjusting said switch to a position where it may be actuated by one or another of said abutments, said adjusting means comprising a slidably supported carriage which supports said switch, and means for subjecting said carriage to sliding movement.

5. A meter testing apparatus comprising a prover including a movable member providing a chamber for a meter-testing medium, piping leading from the chamber of said movable member and adapted to be connected to a meter to be tested, an electrically actuated valve interposed in said piping and operable to control passage of testing medium from the chamber of said movable member to the meter being tested, an electrical switch for controlling actuation of said electrically actuated valve, a plurality of spaced abutments supported by said movable member and movable therewith for actuating said switch, and means for adjusting said switch to a position where it may be actuated by one or another of said abutments, said adjusting means comprising a slidably supported carriage which supports said switch, and means including a rack and pinion for subjecting said carriage to sliding movement.

6. A meter testing apparatus comprising a prover including a movable member providing a chamber for a meter-testing medium, piping leading from the chamber of said movable member and adapted to be connected to a meter to be tested, an electrically actuated valve interposed in said piping and operable to control passage of testing medium from the chamber of said movable member to the meter being tested, an electrical switch for controlling actuation of said electrically actuated valve, a plurality of spaced abutments supported by said movable member and movable therewith for actuating said switch, and means for adjusting said switch to a position where it may be actuated by one or another of said abutments, said adjusting means comprising a slidably supported carriage which supports said switch, and means including a rack mounted on said carriage and a pinion mounted on a shaft and meshing with said rack for subjecting said carriage to sliding movement, said shaft being provided with a knob for rotating said shaft and said knob being provided with indicating means which is rotated with said knob relative to a dial so as to indicate proper positioning of said switch.

PHILIP R. WATSON.

REFERENCES CITED

The following references are of record in the file of this patent:

UNITED STATES PATENTS

| Number | Name | Date |
|---|---|---|
| 528,547 | Marshall | Nov. 6, 1894 |
| 1,505,699 | Clancy et al. | Aug. 19, 1924 |
| 1,934,291 | Baas | Nov. 7, 1933 |
| 2,448,616 | Oakley et al. | Sept. 7, 1948 |